C. S. Hunt,
Making Band Pulleys.

Nº 20,881.    Patented July 13, 1858.

UNITED STATES PATENT OFFICE.

CALEB S. HUNT, OF BRIDGEWATER, MASSACHUSETTS.

MACHINE-PULLEY.

Specification of Letters Patent No. 20,881, dated July 13, 1858.

*To all whom it may concern:*

Be it known that I, CALEB S. HUNT, of Bridgewater, in the county of Plymouth, in the State of Massachusetts, have invented a new and useful mode of constructing, composing, and manufacturing machine-pulleys for driving machines or parts of machines wherever a band of any kind is now or may be employed; and I do hereby declare that the following is a full and exact description thereof, reference being had to the accompanying drawings, and to the letters of reference marked thereon, they making a part thereof.

The nature of my invention consists in the employment of a substance in the construction of said pulleys which shall be lighter, cheaper and more adjustable than those made of substances heretofore known and used, and which has also the quality of elasticity, strength, and adhesiveness to the band without abrasion or wearing of the surface of the pulley, in a greater degree than any pulley made or used before my said invention, and also enables a slacker or narrower band to do the same work with a tighter and wider one, and also thereby removes an unnecessary amount of friction on the journals of the machine, and, consequently, diminishes the driving power of the whole.

For the purpose aforesaid, I construct and compose my pulleys, whatever the diameter or width may be, of cork-bark; or of the substance commonly known as cork; and well known in the commercial market. Placing the layers of cork in a pile in the manner in which any ordinary board or plank solid pulley is made; and inclosing or holding them in said position on the shaft or mandrel, or wherever used by means of iron or wooden disks or collars through the center of which holes are drilled or mortised, for the purpose of holding the pulley securely upon the shaft. These layers may be more or less compressed between said disks before attachment to the shaft intended to be turned, and then fastened by rivets from disk to disk passing through the cork of the pulley; and the whole is then fastened to the shaft by a nut and screw in the ordinary way; or they may be fitted and attached to an iron hub of any size, which said hub is fastened to the shaft by a nut and screw on the end of the shaft, or otherwise; or, wherever the pulley desired be small, and the work not heavy, the cork pulley may be bored and driven on the shaft and so operate without the expense or trouble of a collar, or hub, or nut and screw. When so bored and put on the layers should be pinned or pegged together, as layers of leather are pegged, to give the pulley a consistence and body.

The accompanying drawing represents some of the modes of construction I have used for pulleys of my invention.

Figure 1:
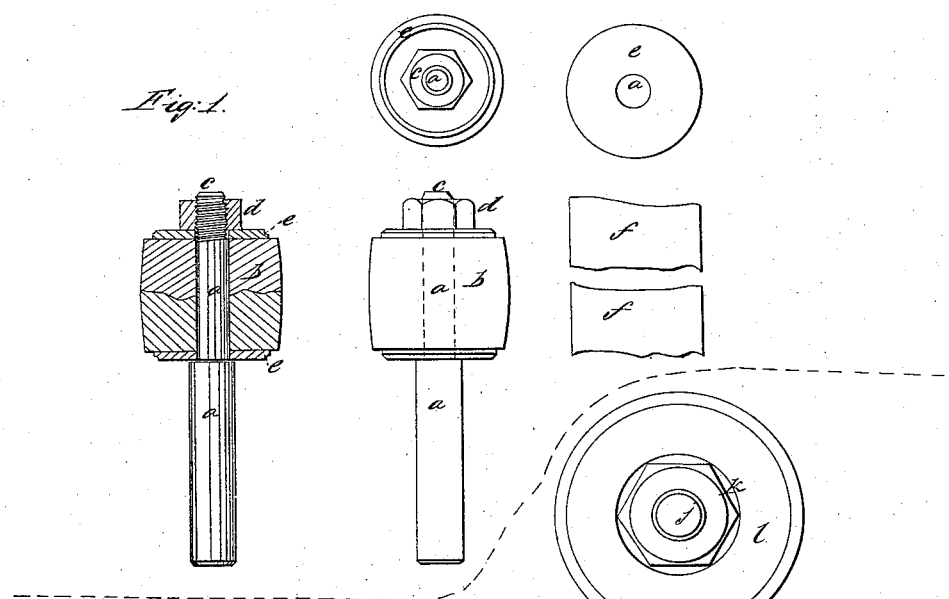

Figure 1, represents a pulley, without the hub spoken of, attached to the shaft between the collars, by a nut and screw at the end thereof. (*a*,) represents the shaft to be turned; (*b*,) represents the driving pulley, embraced between the disks or collars (E, E,) and held firmly to the shaft, by the screw (*c*,) and nut (*d*); *f*, *f*, represent two layers or disks of cork (with a hole in the center of each, not seen in the drawing) before being put on the shaft between the collars, and screwed up.

Figure 2:
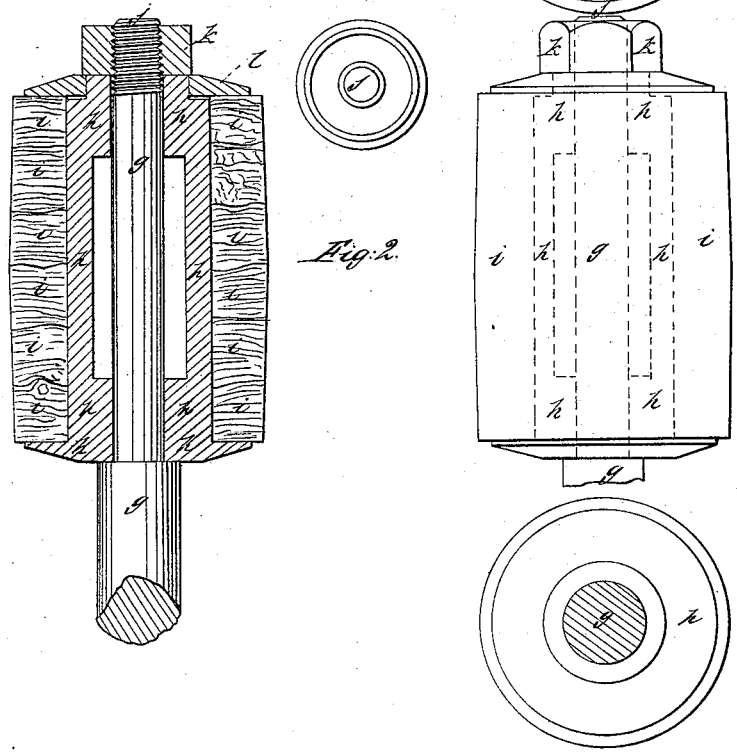

Fig. 2, represents a pulley made with the hub, above described or referred to, (*g*) the shaft, (*h*) the iron hub fitted to the shaft, (*i*) the similar layers of cork, (*j*) the screw on the end of the shaft, (*k*) the nut by which the hub is held to the shaft, (*l*) a collar, or washer, between the nut and the body of cork to hold it compressed as may be desired.

Having thus described my invention I claim—

The construction and use of machine-pulleys with the bearing or band surface made of cork, as above described.

In testimony whereof I have signed my name before two subscribing witnesses.

CALEB S. HUNT.

Witnesses:
A. HERBERT,
JOHN S. HOLLINGSHEAD.